United States Patent
Heering et al.

(10) Patent No.: US 6,522,648 B1
(45) Date of Patent: Feb. 18, 2003

(54) PARALLEL BACKPLANE ARCHITECTURE PROVIDING ASYMMETRIC BUS TIME SLOT CROSS-CONNECT CAPABILITY

(75) Inventors: Kevin Paul Heering, Toney, AL (US); Robert David Deaton, Madison, AL (US); John Robert Coffman, III, Huntsville, AL (US); Michael Francis Lamy, Huntsville, AL (US)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 09/491,944

(22) Filed: Jan. 26, 2000

Related U.S. Application Data

(63) Continuation of application No. 08/827,233, filed on Mar. 28, 1997.

(51) Int. Cl.[7] .......................... H04L 12/50; H04L 12/43
(52) U.S. Cl. ...................... 370/363; 370/366; 370/379; 370/458
(58) Field of Search .............................. 370/362, 363, 370/366, 379, 364, 375, 376, 378, 358, 458, 321, 337, 360

(56) References Cited

U.S. PATENT DOCUMENTS

| | | | |
|---|---|---|---|
| 4,377,859 A | 3/1983 | Dunning et al. | 370/378 |
| 4,510,597 A | 4/1985 | Lewis | 370/366 |
| 4,639,909 A | 1/1987 | Nirschl et al. | |
| 5,377,181 A | 12/1994 | Rogers | 370/366 |
| 5,784,369 A | 7/1998 | Romiti et al. | 370/358 |
| 5,867,496 A | 2/1999 | Peres et al. | 370/468 |

Primary Examiner—Alpus H. Hsu
Assistant Examiner—Afsar M. Qureshi
(74) Attorney, Agent, or Firm—Allen, Dyer, Doppelt, Milbrath & Gilchrist, P.A.

(57) ABSTRACT

A channel interface architecture for a time division multiplexed (TDM) data communication system has a plurality of TDM communication ports coupled to serial TDM communication channels. The channel interface architecture interfaces data from any channel of any TDM communication port with any TDM communication channel of any other TDM communication port, on a per time slot/channel basis. The architecture includes a parallel data bus portion, an address bus portion, and a control portion. Each of a plurality of TDM communication channel interface units, associated with the ports, includes a multipage memory that stores data received from an associated serial communication link. The memory also selectively stores data that has been asserted onto the data bus portion of the bus architecture from another interface unit. A channel assignment memory of a bus controller is sequenced to cause data of a TDM communication channel in a selected interface unit's memory to be transferred to any memory location of another interface unit. The direction of data transfer is governed by the polarity of an edge of a clock signal conveyed over a control portion of the bus architecture.

12 Claims, 3 Drawing Sheets

PARALLEL BACKPLANE ARCHITECTURE PROVIDING ASYMMETRIC BUS TIME SLOT CROSS-CONNECT CAPABILITY

This is a continuation of Application Ser. No. 08/827,233, filed Mar. 28, 1997 pending.

FIELD OF THE INVENTION

The present invention relates in general to communication systems, and is particularly directed to a new and improved backplane architecture for digital telecommunication equipment that has the capability of providing for the asymmetric interchange of time slot data among multiple pieces of time division multiplexed communication equipment installed in respective card slots of the backplane.

BACKGROUND OF THE INVENTION

Time division multiplexed (TDM) data communication equipment currently employed by telecommunication network service providers is typically configured to accommodate a prescribed number of data communication channels or time slots, respectively associated with various customer premises devices (e.g., data terminal equipments or DTEs). As a non-limiting illustration, a T1 network link contains twenty-four DS0 channels or time slots, within each of which eight bits of data are serially transmitted.

At a hub site, where routing calls among various users of the network is controlled, it is necessary to provide for the cross-connect or interchange of time slots/channels among respective ports of the TDM routing equipment. This may sometimes entail the transfer of a set or group of successively contiguous time slots of the TDM link porting one (source) circuit card to the TDM link porting another (destination) circuit card. Because conventional serial bus-based TDM routing equipment employs bus segmentation, which is not designed to route a multiple DS0 call across multiple serial bus segments, then if the TDM segment of the latter (destination) circuit card does not have the requisite number (or segment) of successively contiguous time slots, servicing the calls associated with the channels of interest is impaired, and utilization of the available bandwidth of the TDM link is reduced, until the required set of contiguous time slots become available. Because conventional serial bus-based TDM routing equipment is based upon symmetrical data transfer, full utilization of bandwidth is not realized with new asymmetrical data communication technologies.

SUMMARY OF THE INVENTION

In accordance with the present invention, the above described problems are effectively solved by a new and improved asymmetric TDM telecommunication time slot-routing backplane architecture that is parallel bus-based, rather than serial bus-based, which allows the data to be clocked at frequency reduced by a factor of the data size (by a factor of eight for a standard eight bits-per time slot serial format), thereby allowing the use of less costly components distributed among individual interfaces, and decreasing EMI (electromagnetic interference) effects attributed to higher bus clock speeds. The backplane architecture according to the present invention includes respective data, address and control bus portions along which interface circuit card slots served by the backplane are installed.

The data bus portion is a multi-bit parallel data bus, having a data width corresponding to the number of data bits conveyed over a TDM channel during a respective channel time slot—typically eight bits—for a DS0 time slot, as noted above. Respective time slot data packets to be asserted onto the parallel data bus are converted from serial format to parallel format by serial-to-parallel conversion circuitry of a respective port's interface circuit card. Conversely, data read from the parallel data bus for delivery to a destination device is converted back into serial format by parallel-to-serial conversion circuitry within a respective port's interface circuit card.

The address bus portion of the backplane has a plurality of card or interface select lines and a multi-bit, parallel channel/time slot address bus. The number of select lines corresponds to the number of physical interface card slots of the backplane. An interface circuit card slot decoder of a backplane controller decodes the contents of respectively addressed memory locations of a time slot assignment memory of the backplane controller into card slot selection signals. The multi-bit parallel address bus is coupled to a portion of the time slot assignment memory's data bus used to address a particular time slot/channel in an interface circuit card selected by the card slot decoder. As will be described, the direction of data flow with respect to the backplane depends upon the clock edge polarity of a backplane clock signal.

Data asserted onto the data bus during the talk or transmit portion of a respective time slot clock cycle is read from that memory location of the time slot memory of a source interface circuit card as selected by a respective card select line, and having an address associated with the particular time slot/channel identified by the contents of the card slot link. Data read from the data bus during a listen or receive portion of a respective time slot clock cycle is written into a storage location of a time slot memory of a destination interface circuit card as selected by a respective card select line, and having an address associated with the particular time slot/channel.

The data contents of respective memory location within the time slot assignment memory of the backplane controller include a card slot code and a channel select code, which define time slot or channel interchange (DS0 cross connect) assignments representative of which time slots of circuit cards being served by the backplane are to be interchanged, as specified in a time slot memory map. Once loaded into the time slot assignment memory, the time slot exchange memory map is sequenced by an address counter within the bank controller, so as to generate respective source and destination slots associated with the channel interchange among the various interface circuit cards.

Exercizing the dual page memories of the interface circuit cards on a per time slot basis provides two major benefits. First, cross-connect data flow can be either symmetric (the same number of time slots are exchanged between the network and a termination equipment site) or non-symmetric data (the number of time slots transferred from the network to a termination equipment site is different from the number of time slots transferred from a termination equipment site to the network). Secondly, all of the available bandwidth of the backplane is fully utilized.

A respective interface circuit card (network interface circuit card or subscriber-associated interface circuit card) includes a dual port, multi-page time slot/channel data random access memory having respective memory pages, read/write access to which is carried out in ping-pong fashion, so that when one page is in interface mode, the other page is in backplane mode. Each location of the channel data memory stores the (eight bit) data contents of a respective (64 Kbps) DS0 time slot.

For interfacing with the backplane, the dual page time slot data memory has a first data port coupled to the backplane's multi-bit parallel data bus, and a first N-bit wide address port coupled to the multi-bit parallel channel/time slot address bus from the bank controller. For interfacing with a network or customer device interface, such as a data terminal equipment (DTE) interface ported to DTE equipment served by the backplane, the channel data memory has a data port coupled to a parallel data bus. The parallel data bus is coupled to serial-to-parallel and parallel-to-serial conversion circuitry within the DTE interface. In order to address the channel data memory, the interface includes an address counter to which a prescribed clock, such as a 2.048 MHz clock signal supplied by a DTE, is coupled.

In operation, listen and talk modes occupy alternate one-half portions of successive cycles of a bus clock. A frame synchronization reset signal overlaps the last time slot of a frame $F_i$ and the first time slot of the next frame $F_{i+1}$. During the talk or transmit half cycle, whichever page of the channel data memory is not currently being accessed (loaded) by its associated address counter is accessed under the control of the DS0 assignment memory in the bank controller. As the bank controller's DS0 assignment memory is sequentially addressed, respective card select lines, as decoded by the card slot decoder, are asserted valid on the falling edge of a TDM clock signal. The contents of that memory location identified by the multi-bit parallel channel/time slot address bus in the other page of the data memory of the interface card selected by the enabled card select line will be asserted onto the backplane bus on the falling edge of the clock signal.

In the listen mode, data that has been accessed/read out of one of the pages of memory of another (or the same) interface card and placed onto the backplane data bus during the previous talk mode half-cycle is written into one of the dual pages of memory of that other (or the same) interface card. At the same time, data that has been previously written into the other page of dual memory of that respective interface card is accessed/read out therefrom and converted into serial format for delivery to a destination device to which that respective interface card is coupled. Since the listen mode occurs in alternate half cycles with the talk mode, the time slots are enabled on the opposite (rising) clock edges of the bus clock signal.

Thus, as the DS0 channel assignment memory is sequentially addressed, respective card select lines as decoded by card slot decoder will be asserted valid by alternative falling edges of the bus clock signal. The contents of that memory location identified by the multi-bit parallel channel/time slot address bus of one of the two pages of the channel data memory of the interface card selected by the enabled card select line are written onto the backplane bus. The listen port of the card of interest will latch the TDM data on the next successive falling edge of the TDMCLK signal. Also, whichever page of the channel data memory not currently being accessed by the multi-bit parallel channel/time slot address bus is accessed under the control of the address counter, with the read out parallel byte of data then serialized out to an associated network or subscriber device.

DETAILED DESCRIPTION

Figure 1:
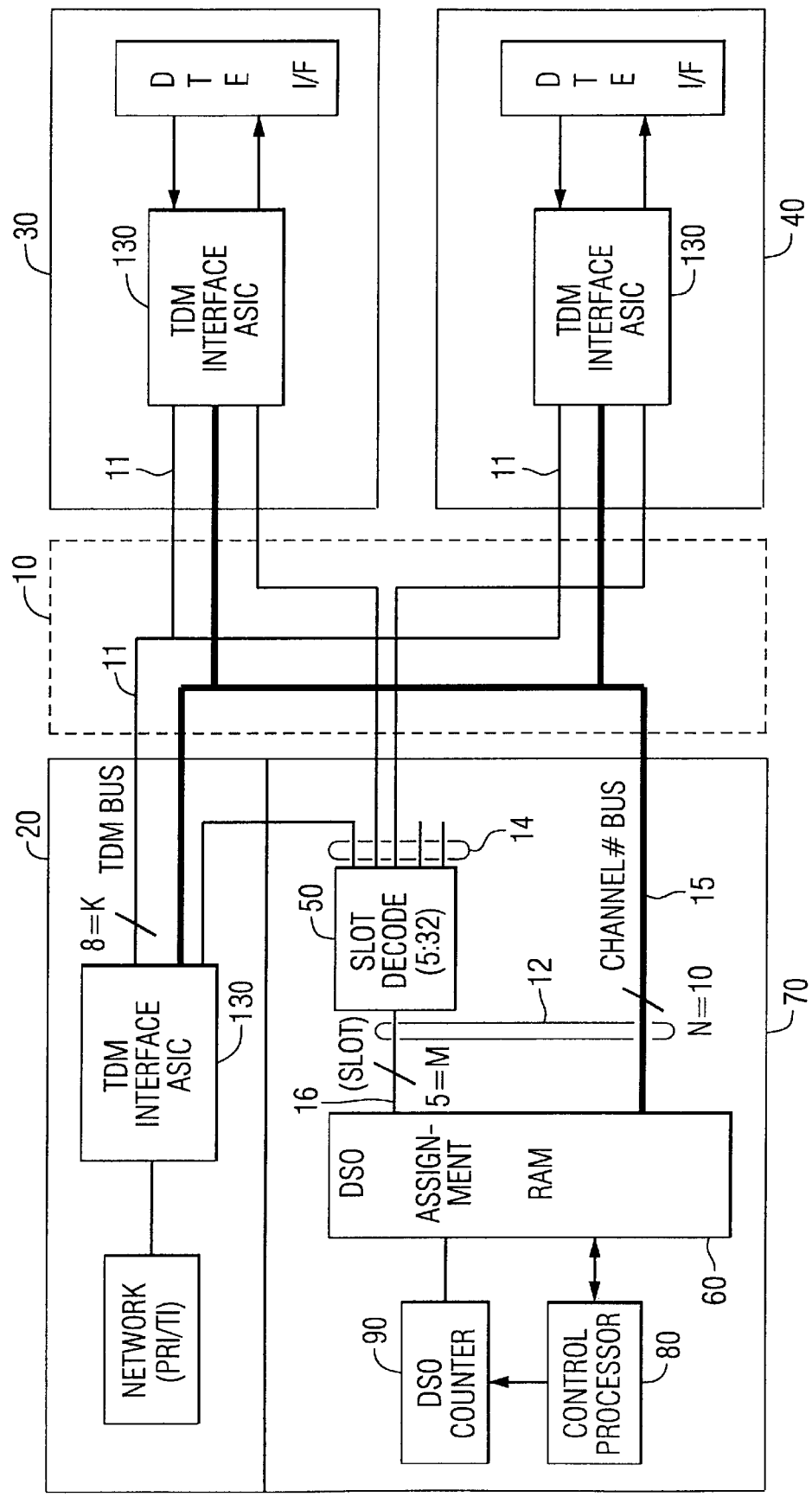
FIG. 1 diagrammatically illustrates an embodiment of the time slot interchange backplane architecture of the present invention.

Before describing in detail the new and improved asymmetric TDM telecommunication time slot-routing backplane architecture in accordance with the present invention, it should be observed that the invention resides primarily in what is effectively a prescribed arrangement of conventional communication circuits and associated digital signal processing components and attendant supervisory control circuitry therefor, that controls the operations of such circuits and components. Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

The backplane architecture in accordance with the present invention is diagrammatically illustrated in FIG. 1 as comprising a multi-bus communication backplane 10, to which various digital communication circuits served by the backplane, including network-associated and subscriber-associated interface circuit cards, are coupled by means of respective card slots distributed along the bus. It will be readily understood that the number of circuit cards that may be employed in the backplane architecture of the invention is not limited to any particular number. In order to simplify the illustration, FIG. 1 shows a single network interface circuit card 20 and two subscriber-associated interface circuit cards 30 and 40 installed/coupled to the backplane.

The backplane 10 includes respective data, address and control bus links to which each of the respective card slots is connected. To avoid unnecessarily cluttering FIG. 1, only the data and address links have been illustrated; control link portions will be described with reference to the set of timing diagrams of FIG. 2. In accordance with the invention, the data bus portion of the backplane, shown at 11, rather than being a bit-serial data link, is a multi-bit parallel data bus, having a data width K corresponding to the number of data bits conveyed over a TDM channel during a respective channel time slot. As a non-limiting example, for a typical DS0 time slot, in which a respective data packet contains eight data bits D1–D8, data bus portion 11 may have a data width of K=8. As will be described, respective time slot data packets to be asserted onto the parallel data bus 11 are converted from TDM serial format to parallel format by serial-to-parallel conversion circuitry of a respective interface circuit card. Conversely, data read from the parallel data bus 11 for delivery to a destination device is converted back into serial format by parallel-to-serial conversion circuitry within a respective interface circuit card.

The address bus portion of the backplane, shown at 12, includes a plurality of card select lines 14, and a multi-bit, parallel channel/time slot address bus 15 having a code width N. The number of card select lines 14 corresponds to the number of physical interface card slots of the backplane. As a non-limiting example, the backplane may contain thirty-two card slots. Each card select line 14 is coupled between a respective output of a card slot decoder and a select input pin of a respective card slot. The card slot decoder 50 is coupled to receive M bits of the contents of respective memory locations of a time slot assignment random access memory (RAM) 60 of a backplane controller 70. For the present example of a thirty-two card slot backplane configuration, an M=5 bit wide, a card slot link portion 16 of the assignment RAM's data bus 12 is coupled to card slot decoder 50. Card slot decoder 50 decodes the M-bit card slot code into a card slot select logic level on one of the card select lines 14.

The multi-bit parallel address bus 15 is coupled to a remaining N bit wide portion of the RAM 60's data bus 12, and is used to address a particular time slot/channel in the interface circuit card identified by the contents of the card slot link portion 16 of the bus 12. As will be described, the direction of data flow, namely, the assertion of data onto or the reading of data from the data bus portion 11 of the backplane 10 by a respective interface circuit card, is governed in accordance with the clock edge polarity (positive-going or negative-going) of a TDM clock signal TDMCLK, shown in the timing diagram of FIG. 2.

As will be described below with reference to the timing diagram of FIG. 2, data asserted onto the data bus 11 (during the talk (T) portion of a respective time slot clock cycle) is read from that memory location of the time slot memory 100 of a source ('talking') circuit card (again as selected by a respective card select line 14), and having an address associated with the particular time slot/channel that is identified by the contents of the card slot link portion 16 of the bus 12. Data read from the data bus 11 (during the listen (L) portion of a respective time slot clock cycle) is written into a memory location of a time slot memory (shown at 100 in FIG. 3, to be described) of a destination ('listening') circuit card (as selected by a respective card select line 14), having an address associated with the particular time slot/channel identified by the contents of the card slot link portion 16 of the bus 12.

Figure 4:
FIG. 4 is a bit assignment diagram of the contents of the time slot assignment memory 60 of the backplane architecture of FIG. 1.

As described briefly above, and as shown in the bit assignment diagram of FIG. 4, the contents of a respective memory location within the (DS0) time slot assignment RAM 60 of the backplane controller 70 include the M bit wide card slot code portion (bits 1–5), which is coupled via the card slot link portion 16 of bus 12 to the card slot decoder 50, and the N bit wide channel select portion (bits 6–15), which is coupled to the time slot portion 15 of data bus 12. The actual data contents of time slot assignment RAM 60 are time slot or channel interchange (DS0 cross connect) assignments representative of which time slots of respective circuit cards being served by the backplane are to be interchanged, as defined by way of a time slot memory map, which is written into the respective memory locations of time slot assignment RAM 60 by the backplane's control processor 80. Once loaded, the time slot exchange memory map is used to control the channel interchange among the various interface circuit cards, by sequentially stepping through the respective memory locations of the RAM 60 under control of a (DS0) address counter 90, which is driven by the clock TDMCLK, as will be described.

As pointed out above, since the dual page memories of the interface circuit cards are exercised on a per time slot basis, the number of time slots exchanged between the network and a termination equipment site is not required to be the same in both directions; namely, data flow may be either symmetric or non-symmetric data. Moreover, the ability to provide cross-connect transport on a per time slot basis provides for full utilitization of the available bandwidth of the backplane.

Figure 3:
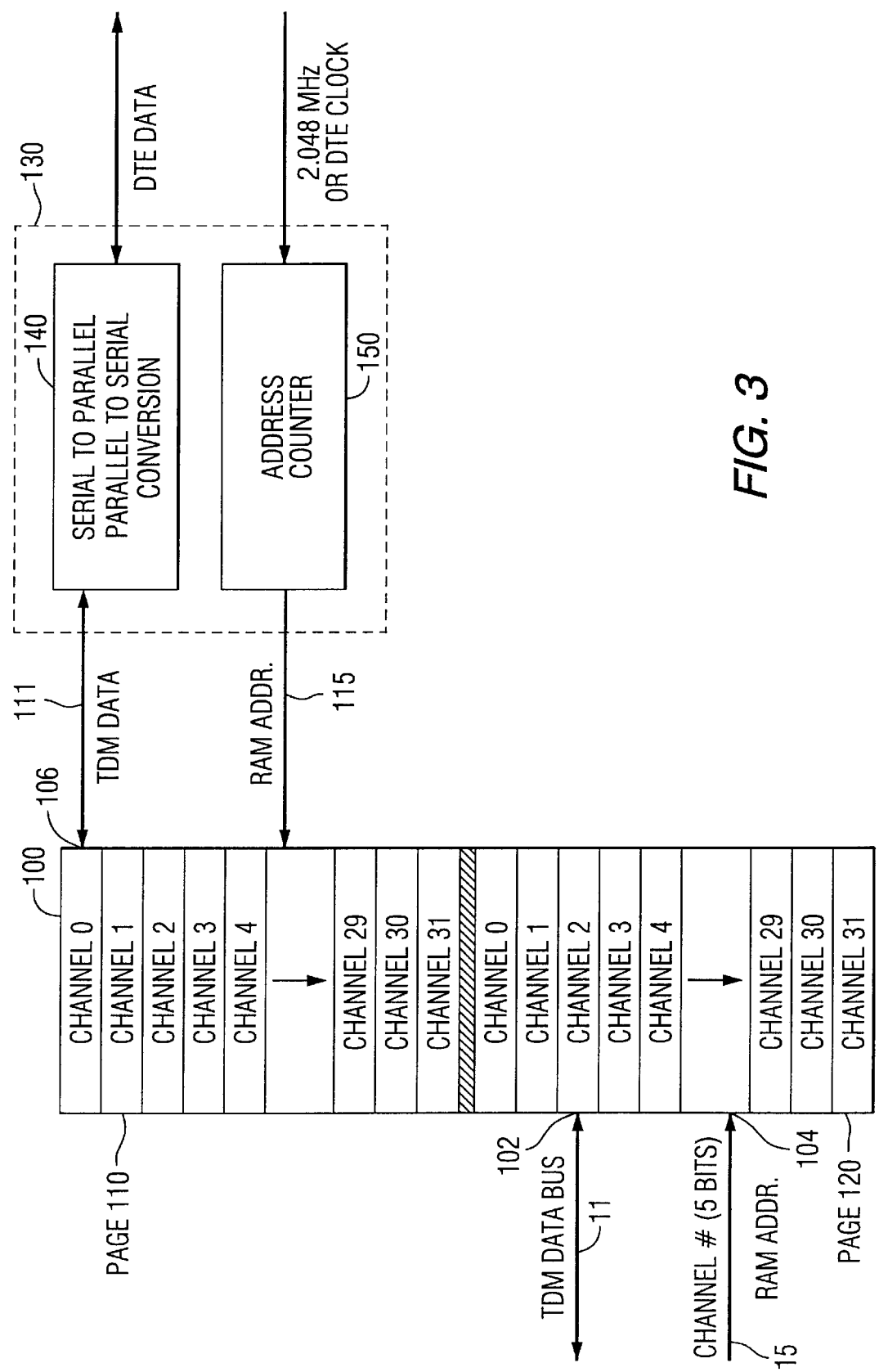
FIG. 3 shows the configuration of a respective interface circuit card of the backplane architecture of FIG. 1.

The configuration of a respective interface circuit card, such as the network interface circuit card 20 and the subscriber-associated interface circuit cards 30 and 40, is diagrammatically illustrated in FIG. 3 as comprising a dual port, multi-page time slot/channel random access memory (RAM) 100 having respective memory pages 110 and 120, read/write access to which is carried out in ping-pong fashion, so that when page 110 is in interface mode, page 120 is in backplane mode, and vice versa. In the present example, each storage location of RAM 100 is used to store the contents (eight bits wide in the present example) of a respective (64 Kbps) DS0 time slot.

For interfacing with the backplane 10, dual page RAM 100 has a first K-bit wide data port 102 that is coupled to the multi-bit parallel data bus 11, and a first N-bit wide address port 104 that is coupled to the multi-bit parallel channel/time slot address bus 15. For purposes of providing an example of a practical time slot/channel interchange scheme that will readily accommodate the number of TDM channels used by currently employed telecommunication equipments, the embodiment of FIG. 4 shows a thirty-two channel interchange capability, which equates to the use of only five of the available (N=ten) bits of the bit assignment diagram of FIG. 4, referenced above.

For interfacing with a network or customer device interface, such as a data terminal equipment (DTE) interface 130, which is ported to DTE equipment served by the backplane, dual page RAM 100 has a second K-bit wide data port 106 that is coupled to a K-bit parallel data bus 111, and an address bus 115. The data bus 111 is coupled to serial-to-parallel and parallel-to-serial conversion circuitry 140 within the DTE interface 130. The address bus is coupled to an address counter 150, to which a prescribed clock, such as a 2.048 MHz clock signal supplied by the DTE, is coupled.

In the listen mode, data to be accessed/read out.of RAM 100 is converted from parallel format into serial format for delivery to a customer device to which the DTE interface 130 is coupled. Conversely, in the talk mode, data sourced from a customer device is converted from serial format into parallel format for storage into RAM 100. In order to address memory 100, the DTE interface 130 includes an address counter 150, to which a prescribed clock, such as a 2.048 MHz clock signal supplied by the DTE, is coupled.

OPERATION

Figure 2:
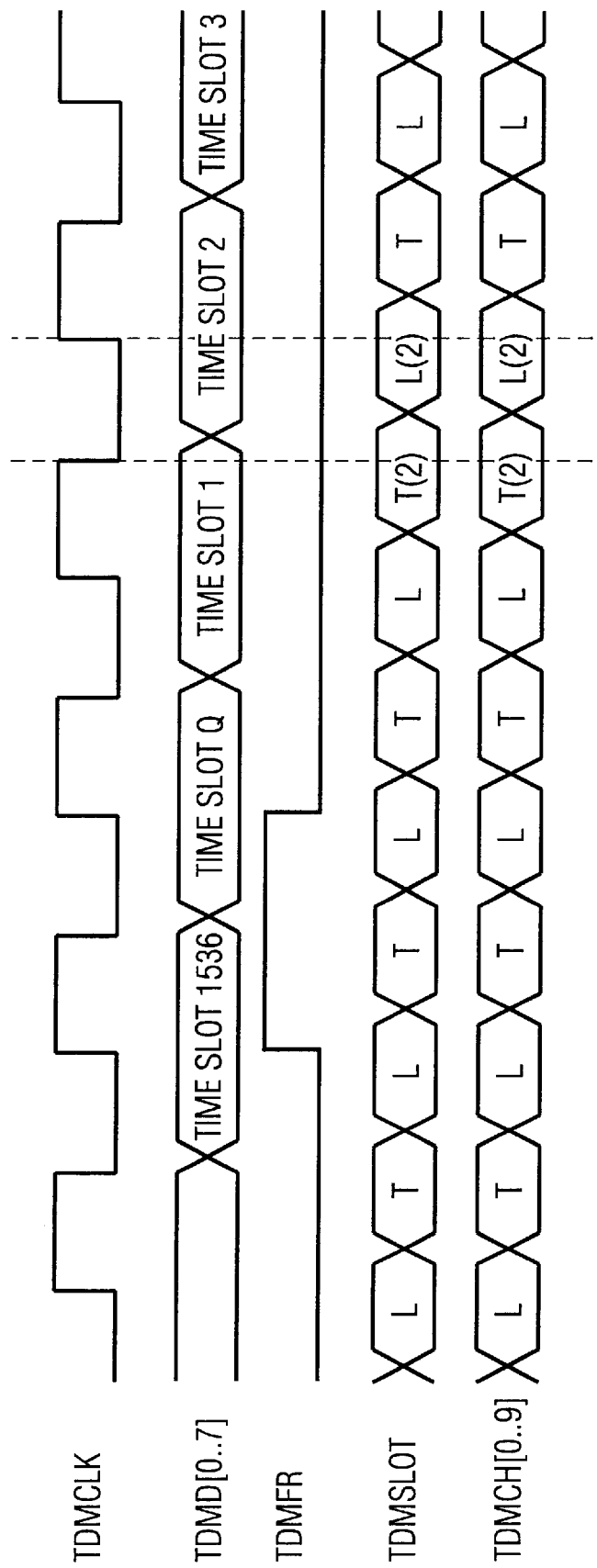
FIG. 2 is a set of timing diagrams associated with the operation of the backplane architecture of FIG. 1.

The operation of the backplane architecture of the present invention may be understood by reference to the set of timing diagrams of FIG. 2. As described above, for a typical frame width of 125 microseconds, clocking the eight bit wide data bus portion 11 of the backplane at a TDM clock rate of 12.288 MHz will provide for 1536 channels time slots (shown as TDM data (TDMD)), during successive halves of respective cycles of the TDM clock signal TDMCLK, within which any network port or subscriber interface circuit card may talk (transmit data onto the backplane), while another card listens (receives data from the backplane). As shown in the timing diagram of FIG. 2, the listen (L) and talk (T) modes of operation occupy alternate one-half portions of successive cycles of the bus clock TDMCLK. A frame synchronization reset signal TDMFR is shown as occurring during one clock cycle that overlaps the second half of the last time slot (1536) of a frame $F_i$ and the first half of the first time slot (0) of the next frame $F_{i+1}$.

TALK MODE

As described above, as successive time slots of serialized data are supplied to an interface card by an associated network or subscriber device, they are converted into parallel format and written into respective memory locations of the pages 110/120 of RAM 100 under the control of address counter 150. During the talk (T) or transmit half cycle, whichever page of memory 100 not currently being accessed (loaded) by the address counter 150 is accessed under the control of the DS0 assignment RAM 60.

In particular, as the DS0 assignment RAM 60 is sequentially addressed by the DS0 address counter 90, respective ones of the card select lines 14, as decoded by card slot decoder 50, and shown in alternate T portions of the TDMSLOT signal, will be asserted valid on the falling edge of the TDM clock signal TDMCLK. During the talk (T) portion of a respective time slot signal TDMSLOT, the contents of that memory location identified by the multi-bit parallel channel/time slot address bus 115 (denoted by TDMCH in FIG. 2), in the other page of memory 100 of the interface card selected by the enabled card select line 14, will be asserted onto the backplane bus 11 on the falling edge of the TDM clock signal TDMCLK.

LISTEN (RECEIVE) MODE

In the listen (L) mode of a respective interface circuit card, data that has been accessed/read out of one of the pages of memory of another interface card and placed onto the data bus 11 during the previous talk (T) mode half-cycle is written into one of the dual pages of memory of that other (or the same) interface card. At the same time, data that has been previously written into the other page of dual memory of that respective interface card is accessed/read out therefrom and converted into serial format for delivery to a destination device to which that respective interface card is coupled. Since the listen mode occurs in alternate half cycles with the talk mode, the time slots are enabled on the opposite (rising) clock edges of the TDMCLK signal.

Namely, similar to the talk mode, described above, as the DS0 assignment RAM 60 is sequentially addressed by the DS0 address counter 90, respective ones of the card select lines 14, as decoded by card slot decoder 50 and shown in alternate L portions of the TDMSLOT signal, will be asserted valid by alternative falling edges of the TDM clock signal TDMCLK. During the listen (L) portion of a respective time slot signal TDMSLOT, the contents of the backplane bus 11 are written into that memory location identified by the multi-bit parallel channel/time slot address bus 115 (denoted by TDMCH in FIG. 2), of one of the two pages 110/120 of RAM 100 of the interface card selected by the enabled card select line 14. The listen port of the card of interest will latch the TDM data on the next successive falling edge of the TDMCLK signal. Also, whichever page of RAM 100 not currently being accessed (loaded) by the multi-bit parallel channel/time slot address bus 115 is accessed under the control of the address counter 150, with the read out parallel byte of data then serialized out to an associated network or subscriber device.

As will be appreciated from the foregoing description, the segmentation problems of conventional serial bus-based time slot routing equipment are effectively obviated by the parallel bus-based backplane architecture of the present invention, which is operative to interface data contained in any TDM communication channel received from any of plural TDM communication ports with any TDM communication channel of any other TDM communication port. Because the data portion of the bus architecture has a parallel structure, the bus controller is readily able to cause data of a TDM communication channel stored in a selected location of a first page of memory of one interface circuit card slot, associated with a first TDM communication port, to be readily transferred to a location in a first page of memory of another interface circuit card slot. Since the dual page memories of the interface circuit cards are exercised on a per time slot basis, the number of time slots exchanged between the network and a termination equipment site need not be the same in both directions. Data flow may be either symmetric or non-symmetric data. Moreover, the ability to provide cross-connect transport on a per time slot basis provides for full utilitization of the available bandwidth of the backplane.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A method of effecting asymmetric transfer of data between first time division multiplexed (TDM) communication channels of a first of a plurality of TDM communication ports of a TDM communication system, and second TDM communication channels of a second of said plurality of TDM communication ports, said TDM communication ports being adapted to interface serial TDM communication channels coupled thereto, comprising the steps of:

(a) storing in memory serial TDM communication channels received from associated serial communication links to which said first and second TDM communication ports are coupled;

(b) controllably transferring, in parallel data format, data contents of locations in memory associated with said first plurality of TDM communication channels of said first TDM communication port to locations in memory associated with TDM communication channels of said second TDM communication port;

(c) controllably transferring, in parallel data format, data contents of locations in memory associated with said second plurality of TDM communication channels of said second TDM communication port, said second plurality of TDM communication channels being different from said first plurality of TDM communication channels, to locations in memory associated with TDM communication channels of said first TDM communication port; and (d) reading out of memory TDM communication channels transferred in step (c) to said first and second ones of said plurality of TDM communication ports to their associated serial communication links.

2. A method according to claim 1, wherein said plurality of TDM communication ports have associated memories, coupled by way of a bus architecture having a parallel data bus over which data contents are transferred in parallel format, and an address bus, and wherein step (b) includes asserting on said address bus signals which are operative to cause TDM communication channel data contents of memory associated with said first TDM communication port to be transferred over said parallel data bus portion to memory associated with said second TDM communication port.

3. A method according to claim 2, wherein said bus architecture further includes a clock control signal line coupled to each of said memories, and conveying a clock signal, having a frequency less than that at which serial data is conveyed by said serial TDM communication channels, which is operative to cause a respectively addressed memory location to place data on or retrieve data from said parallel data bus portion.

4. A method according to claim 3, wherein said clock signal has frequency corresponding to the frequency at which serial data is conveyed by said serial TDM communication channels divided by the number of data bits per channel.

5. A method according to claim 2, wherein said address bus comprises plural select lines coupled to respective memories of said plurality of TDM communication ports, and a multi-bit channel address bus portion coupled to each of said memories associated ones of said plurality of TDM communication ports, and wherein step (b) comprises, during a first portion of a TDM time slot, asserting a select signal on a first of said select lines coupled to memory associated with said first TDM communication port, and asserting a first address code on said multi-bit channel address bus portion, which specifies said selected location in memory associated with said first TDM communication port, data contents of which are to be placed on said parallel data bus portion.

6. A method according to claim 5, wherein step (b) further comprises, during a second portion of a TDM time slot, asserting a select signal on a second of said select lines coupled to memory associated with said second TDM communication port, and asserting a second address code on said multi-bit channel address bus portion, which specifies said selected location in memory associated with said second TDM communication port, to which data placed on said parallel data bus portion is to be transferred.

7. A method according to claim 1, wherein memory associated with a respective one of said plurality of TDM communication ports has a plurality of memory pages each of which has a capacity sufficient to store all communication channels within a frame of serial TDM communication channels coupled thereto, and wherein step (b) comprises storing, in said first page of memory associated with said first communication port, respective TDM communication channels as serially received by said first communication port, while step (c) simultaneously controllably transfers, in parallel data format, data contents of selected locations in a second page of said memory, to locations in memories associated with TDM communication channels of said second TDM communication port.

8. A method according to claim 7, wherein step (c) further comprises controllably transferring, in parallel data format, data from locations in memories associated with TDM communication channels of said second TDM communication port, to selected locations in a first page of said memory, while step (d) simultaneously reads out, from a second page of said memory, TDM communication channels to the serial communication link to which said first TDM communication port is coupled.

9. A method according to claim 1, wherein memory associated with a respective one of said plurality of TDM communication ports has a plurality of memory pages, each of which has a capacity sufficient to store all communication channels within a frame of serial TDM communication channels, and wherein step (c) comprises controllably transferring, in parallel data format, data from locations in memories associated with TDM communication channels of said second TDM communication port, to selected locations in a first page of said memory, while step (d) simultaneously reads out of a second page of said memory TDM communication channels that have been transferred thereto to the associated serial communication link to which said first TDM communication port is coupled.

10. A channel interface architecture for interfacing data between a first time division multiplexed (TDM) communication channel of a first of a plurality of TDM communication ports and a second TDM communication channel of a second of said plurality of TDM communication ports of a TDM communication system, comprising:

a plurality of memories respectively associated with each of said plurality of TDM communication ports, and being operative to store data contents of serial TDM communication channels received from associated serial communication links to which said TDM communication ports are coupled;

a bus architecture coupled to said plurality of memories and having a parallel data bus portion, over which said data contents are transferred in parallel format, an address bus portion, and a control portion; and a bus controller coupled to said bus architecture and being operative to controllably transfer, in parallel data format, data contents of locations in memory associated with said first plurality of TDM communication channels of said first TDM communication port to locations in memory associated with TDM communication channels of said second TDM communication port, and to controllably transfer, in parallel data format, data contents of locations in memory associated with said second plurality of TDM communication channels of said second TDM communication port, said second plurality of TDM communication channels being different from said first plurality of TDM communication channels, to locations in memory associated with TDM communication channels of said first TDM communication port, and to read out of memory TDM communication channels to said first and second ones of said plurality of TDM communication ports to their associated serial communication links.

11. A channel interface architecture according to claim 10, wherein said bus architecture includes a clock control signal line coupled to each of said memories, and conveying a clock signal having a frequency less than that at which serial data is conveyed by said serial TDM communication channels, which is operative to cause data to be written to or read out from a respectively addressed memory location.

12. A channel interface architecture according to claim 11, wherein said clock signal has frequency corresponding to the frequency at which serial data is conveyed by said serial TDM communication channels divided by the number of data bits per channel.

* * * * *